Patented Aug. 25, 1953

2,650,252

UNITED STATES PATENT OFFICE 2,650,252

PREPARATION OF KETONE-DIARYLAMINE CONDENSATES

Ivan Mankowich, Naugatuck, Conn., assignor to United States Rubber Company, New York, N. Y., a corporation of New Jersey No Drawing. Application July 3, 1951, Serial No. 235,102

9 Claims. (Cl. 260—576)

This invention relates to improvements in the preparation of the condensation products of aliphatic ketones and diarylamines.

The composite condensation products of aliphatic ketones with diarylamines, especially the condensation product of acetone with diphenylamine, and acetone with phenyl b-naphthylamine have been sold widely as rubber antioxidants. Ordinarily, these have been prepared in the presence of an acidic catalyst such as iodine, ferrous iodide, hydriodic acid, hydrogen bromide, zinc chloride, calcium chloride, etc.

It has now been found that the condensation of aliphatic ketones and diarylamines can be promoted by a halogenated hydrocarbon selected from the class consisting of haloalkanes, haloalkenes, halocycloalkanes, and haloalkyl benzenes, having in each case a halogen atom directly linked to a saturated carbon atom, and further the halogen in each case having an atomic weight of at least 35. The limitation that the halogen have an atomic weight of at least 35 is imposed since it has been found that fluorinated alkanes are inoperable.

An excess of either ketone or amine can be used, or they can be reacted in equimolecular proportions. It is preferred, however, to have the ketone in excess.

Exemplary of such promoters are the following:

Methyl chloride
Methylene chloride
Chloroform
Carbon tetrachloride
Ethyl chloride
Dichloro ethane
Trichlorethane
Tetrachlorethane
Allyl chloride
Methallyl chloride
Penta chlorethane
Hexachlorethane
n-Propyl chloride
Iso-propyl chloride
Tertiary butyl chloride
n-Butyl chloride
n-Amyl chloride
Sec.-amyl chloride
Tert.-amyl chloride
Methyl iodide
Methylene iodide
Ethyl iodide
Butyl iodide Methyl bromide
Methylene bromide
Bromoform
Carbon tetrabromide
Ethyl bromide
n-Propyl bromide
n-Butyl bromide
n-Amyl bromide
Benzyl chloride
Benzal chloride
Benzo trichloride
Sec.-amyl bromide
n-Hexyl bromide
n-Heptyl bromide
n-Nonyl bromide
n-Decyl bromide
n-Dodecyl bromide
n-Hexyl iodide
n-Heptyl iodide
n-Decyl iodide
Cyclohexyl iodide
Cyclopentyl bromide
Dichlorocyclohexane The amount of promoter to be used is based upon the amount of halogen in the promoter and can vary from 0.03 to 10%, or better, but is preferably 0.05 to 5.0% of the weight of the diarylamine. For example, on 100 parts of diphenylamine, 1 part of chlorine, as ethyl chloride, can be used, which calculates to 1.81 parts ethyl chloride. The amount of promoter to be used will depend on:

1. The nature of the promoter, the diarylamine and the ketone.
2. The time cycle of production.
3. The temperature of reaction.
4. The desired viscosity of the product.
5. The range of proportions of the ketone and the diarylamine.

The reaction initiator may be added as such, or dissolved in the ketone, or in the diarylamine, before the reactants are brought to reaction temperature or, alternately, the mixture of the reactants may be brought to temperature before the addition of the promoter via injection. Furthermore, mixtures of the promoters may be used. Another variation is the concurrent addition of the reactants to a heated reaction zone.

It is well-known that the reaction of an aliphatic ketone and a diarylamine can be carried out by reflux, by passage of ketone vapor through the amine, and by autoclaving of the reactants at 140° C. upwards. The promoters of this invention are applicable to all these methods, although for the vapor process at 150° C. or above, generally, the higher boiling halogenated materials are preferred.

While the use of the present reaction promoters is primarily intended in the systems, acetone-diphenylamine, and acetone-phenyl beta-naphthylamine, other aliphatic ketone-diarylamine systems, such as:

Acetone-phenyl alpha-naphthylamine
Acetone-phenyl p-tolylamine
Acetone-di-p-tolylamine
Methyl ethyl ketone-diphenylamine
Methyl ethyl ketone-phenyl b-naphthylamine
Methyl ethyl ketone-phenyl xenylamine
Methyl ethyl ketone-phenyl a-naphthylamine may be used, and are also subject to reaction initiation, by the promoters of this invention.

The following examples illustrate the invention:

Example 1

Into a 60 gallon autoclave, 232 lbs. diphenylamine, 159 lbs. acetone, and 1.22 lbs. methyl iodide were reacted about six hours at about 280° C.

The condensate product was discharged from the autoclave, cooled, and dried.

A yield of 292 lbs. of a dark material having a viscosity of 22 poises, comparable in rubber antioxidant properties to present commercial acetone-diphenylamine condensates, was obtained.

Example 2

A similar run in a 60 gallon autoclave using 232 lbs. diphenylamine, 159 lbs. acetone, and 0.835 lb. methyl bromide gave a product having a viscosity of 4.4 poises of satisfactory rubber antioxidant properties.

Example 3

Into a 60 gallon autoclave, 270 lbs. phenyl b-naphthylamine and 143 lbs. acetone were introduced and the temperature raised to a range of 275–282° C. During the rise to reaction temperature 684 gr. (1.5 lbs.) carbon tetrachloride were injected at 208° C. The reaction mass was heated four hours after injection of the carbon tetrachloride. The four hour period includes the time necessary to raise the temperature to 278° C. At the end of this time, the autoclave was discharged and the reaction product stripped of any volatiles, such as acetone, water and unchanged carbon tetrachloride and dried. A yield of 307 lbs. of a viscous oil was obtained which was an excellent rubber antioxidant.

Example 4

A steel glass-lined autoclave was charged with:

|  | G. |
|---|---|
| Diphenylamine | 180 |
| Acetone | 163 |
| Carbon tetrachloride | 5.08 | and the reaction carried out at 150° C. for sixteen hours. The autoclave was discharged and the reaction product dissolved in benzene, and the benzene extract washed with dilute sodium hydroxide, then with water, and finally dried and ground. A yield of 257.1 g. of a tan powder having a ball and ring of 116° C. was obtained which was satisfactory as a rubber antioxidant.

Example 5

The following table describes runs in sealed glass tubes. In each case 59.6 gr. diphenylamine and 39.7 gr. of acetone were used. The amount of catalyst is indicated in the table. The general conditions of reaction were 6 hours at 240–250° C. In each case the tube, after cooling, was opened and the reaction product removed and dried under reduced pressure.

| Run No. | Catalyst | Amount in Grams | Gram Yield of Condensation Product | Condensate Viscosity (Poises at 30° C.) |
|---|---|---|---|---|
| 1 | Methyl chloride | .110 | 74.8 | 152 |
| 2 | Methylene chloride | .092 | 77.3 | 588 |
| 3 | Chloroform | .086 | 80. | 477 |
| 4 | Carbon tetrachloride | .083 | 70.8 | 145 |
| 5 | Allyl chloride | .166 | 73.8 | 41 |
| 6 | Methyl bromide | .205 | 75.8 | |
| 7 | 2-Bromo n-octane | .417 | 74.0 | 712 |
| 8 | Cetyl bromide | .662 | 76.4 | 127 |
| 9 | Bromo cyclohexane | .354 | 82.8 | 1,010 |
| 10 | Isobutyl bromide | .297 | 77.5 | 458 |
| 11 | N-butyl Bromide | .297 | 78.9 | 2,060 |
| 12 | Sec.-butyl bromide | .297 | 77.6 | 344 |
| 13 | Tert.-butyl bromide | .297 | 76.0 | 520 |
| 14 | 2,3-Dibromo butane | .297 | 76.1 | 389 |
| 15 | Methyl iodide | .308 | 79.2 | |
| 16 | Benzotrichloride | .142 | 74.3 | 215 |
| 17 | Benzyl bromide | .372 | 76.1 | 224 |
| 18 | 1,4-Dibromo butene-2 | .232 | 75.9 | 768 |

Example 6

In a glass lined vessel, 169 grams diphenylamine and 5.39 gr. cyclohexyl bromide were heated to 150° C. and acetone vapor passed through at that temperature until a test portion gave a ball and ring of 75° C. The product was a light tan variable resin-like product having useful rubber antioxidant properties.

Having thus described my invention, what I claim and desire to protect by Letters Patent is:

1. In a method of preparing a composite product of condensation of an aliphatic ketone and a diarylamine, the improvement which consists in adding to the reaction mix, a chemical promoter which is a halogenated hydrocarbon selected from the class consisting of haloalkanes, halo-alkenes, halocycloalkanes, haloalkyl benzenes, having in each case a halogen atom directly linked to a saturated carbon atom, the halogen of which has a molecular weight of at least 35, and heating the mix in the presence of said promoter.

2. In a method of preparing a composite product of condensation of a dialkyl ketone and a diarylamine, the improvement which consists in adding to the reaction mix, a chemical promoter which is a haloalkane, the halogen of which has a molecular weight of at least 35, and heating the mix in the presence of said promoter.

3. In a method of preparing a composite product of condensation of acetone and diphenylamine, the improvement which consists in adding to the reaction mix, a chemical promoter which is a haloalkane, the halogen of which has a molecular weight of at least 35, and heating the mix in the presence of said promoter.

4. In a method of preparing a composite product of condensation of an aliphatic ketone and a diarylamine, the improvement which consists in adding to the reaction mix, methyl iodide as a chemical promoter of the reaction, and heating the mix in the presence of said promoter.

5. In a method of preparing a composite product of condensation of an aliphatic ketone and a diarylamine, the improvement which consists in adding to the reaction mix, methyl bromide as a chemical promoter of the reaction, and heating the mix in the presence of said promoter.

6. In a method of preparing a composite product of condensation of an aliphatic ketone and a diarylamine, the improvement which consists in adding to the reaction mix, carbon tetrachloride as a chemical promoter of the reaction, and heating the mix in the presence of said promoter.

7. In a method of preparing a composite product of condensation of an aliphatic ketone and a diarylamine, the improvement which consists in adding to the reaction mix, cyclohexyl bromide as a chemical promoter of the reaction, and heating the mix in the presence of said promoter.

8. In a method of preparing a composite product of condensation of a dialkyl ketone and a diarylamine, the improvement which consists in adding to the reaction mix, a chemical promoter which is a haloalkane, the halogen of which has a molecular weight of at least 35, and heating the mix in the presence of said promoter, the proportion of said promoter ranging, by weight, from about 0.03 to about 10 percent, based on the diarylamine.

9. In a method of preparing a composite product of condensation of a dialkyl ketone and a diphenylamine, the improvement which consists in adding to the reaction mix, a chemical promoter which is a haloalkane, the halogen of which has a molecular weight of at least 35, and heating the mix in the presence of said promoter, the proportion of said promoter ranging, by weight, from about 0.03 to about 10 percent, based on the diphenylamine.

IVAN MANKOWICH.

References Cited in the file of this patent

UNITED STATES PATENTS

| Number | Name | Date |
|---|---|---|
| 1,935,279 | Ter Horst | Nov. 14, 1933 |
| 2,160,223 | Meuser | May 30, 1939 |